April 8, 1924.  
A. GALBRAITH  
1,489,998  
MOTIVE POWER VEHICLE FOR SERVICE ON ROADS AND RAILS  
Filed July 6, 1923  
5 Sheets-Sheet 4
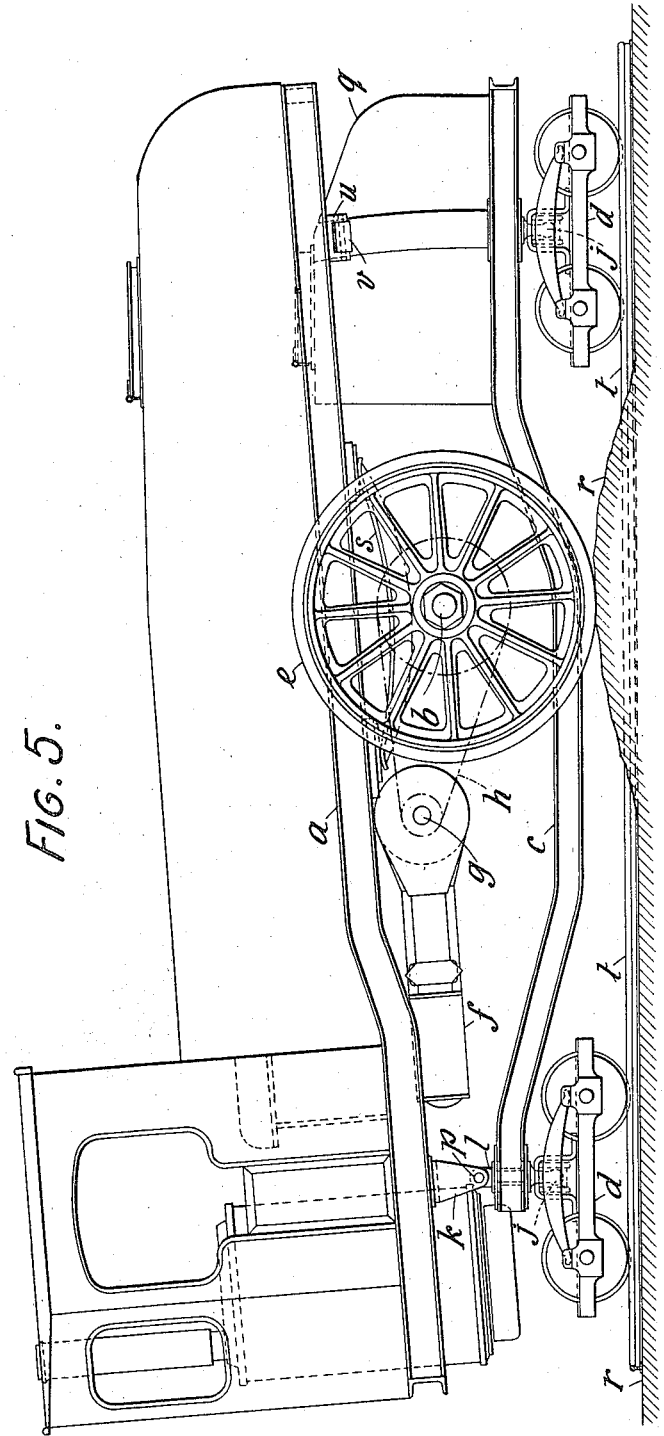

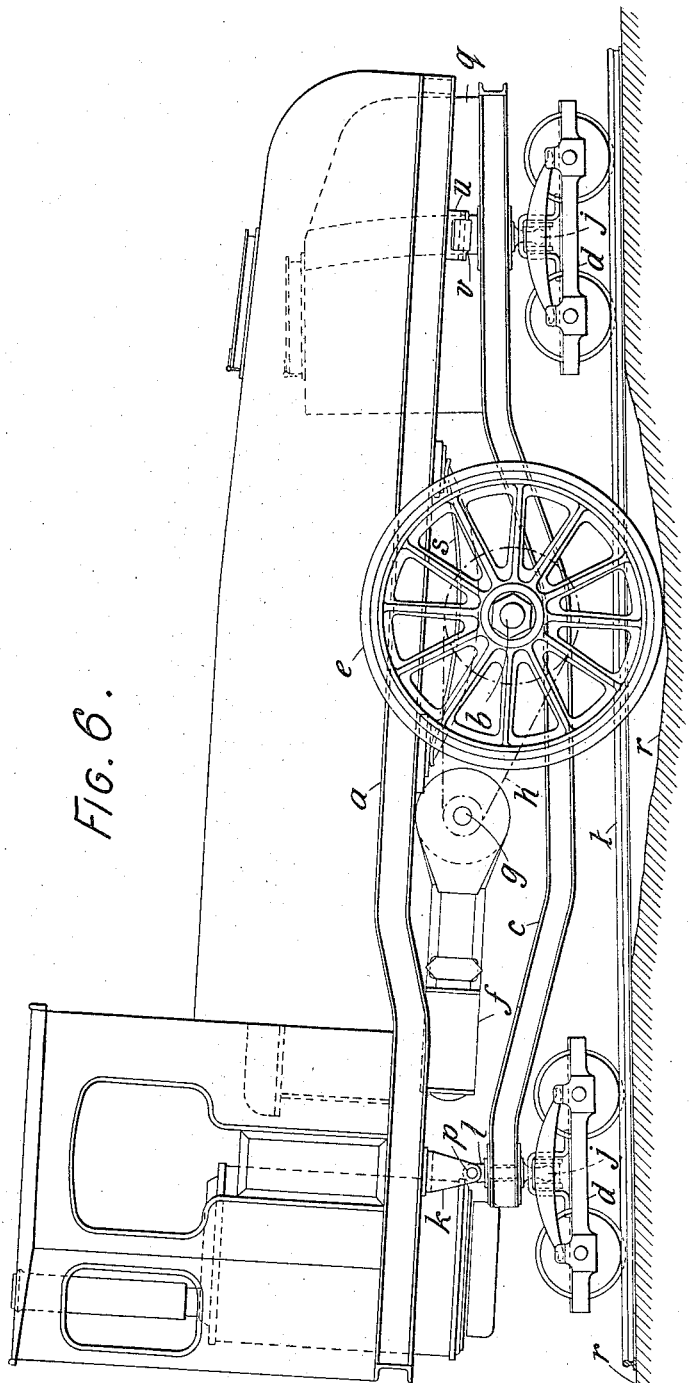

Patented Apr. 8, 1924.

1,489,998

UNITED STATES PATENT OFFICE.

ALEXANDER GALBRAITH, OF DALMUIR, SCOTLAND, ASSIGNOR TO ROADRAILS LIMITED, OF LONDON, ENGLAND, A COMPANY OF GREAT BRITAIN.

MOTIVE-POWER VEHICLE FOR SERVICE ON ROADS AND RAILS.

Application filed July 6, 1923. Serial No. 649,916.

*To all whom it may concern:*

Be it known that I, ALEXANDER GALBRAITH, a subject of the King of England, residing at Ravenswood, Dalmuir, Dumbartonshire, Scotland, have invented certain new and useful Improvements in Motive-Power Vehicles for Service on Roads and Rails, of which the following is a specification.

This invention concerns improvements in or relating to power driven vehicles and is applicable with particular advantage to vehicles for service on roads and rails of the well known type in which use is made of at least one rail bogie or like wheel support running on a rail track and at least one pair of driving wheels running on an ordinary road or specially prepared road-wheel ways outside or inside said rail track, while the load is carried on appropriate rolling stock on the rails.

Now the object of the present invention is to provide a vehicle of extreme simplicity coupled with great flexibility by a construction capable of being readily embodied in any appropriate type of vehicle, and when embodied in a vehicle of the class above referred to, enabling the latter not only to negotiate any curves and irregularities of the rail and road tracks with the greatest ease but also to perform any necessary lateral movements and at the same time tilting movements in a vertical sense.

To this end the invention consists of a frame work structure flexibly jointed between its main parts and comprising broadly speaking, a super-structure adapted to perform movements substantially in a vertical sense and, as a whole, supported on its wheel carriage preferably through the medium of a substructure so as to be capable of performing similar movements also in a lateral or horizontal sense, by preference, however, jointly with the substructure. The superstructure hereinafter referred to as the main or upper frame is advantageously employed to carry the main machinery such as the engine, the gear and all the requisite accessories. It is flexibly connected to the substructure formed by an auxiliary or subframe, for instance, pivotally, preferably at the forward end of the vehicle so as to enable it to tip freely in a vertical plane about a horizontal axis. At the same end, and preferably directly below the above connection, the main or upper frame is pivotally supported by a substantially universal joint about a vertical axis, most conveniently through the agency of the lower frame which to that end is pivoted on its wheel support or bogie through the medium preferably of a ball-joint thus enabling the superstructure to oscillate also laterally in unison with the substructure about this ball-joint or vertical fulcrum. At the same time the two frames, at the opposite end are arranged and guided so as to permit of relative vertical movement between them.

In the annexed drawings, the invention is illustrated by way of example as applied to a road and rail tractor having a bogie forward and a bogie aft and a single pair of road driving wheels arranged substantially centrally to run on the road outside of the rail track.

Fig. 5 illustrates a lateral elevational view showing how the bogies with the substructure are keeping the rails, and the position of the superstructure while the driving wheels are passing over a substantially large obstacle on the road.

Figure 1:
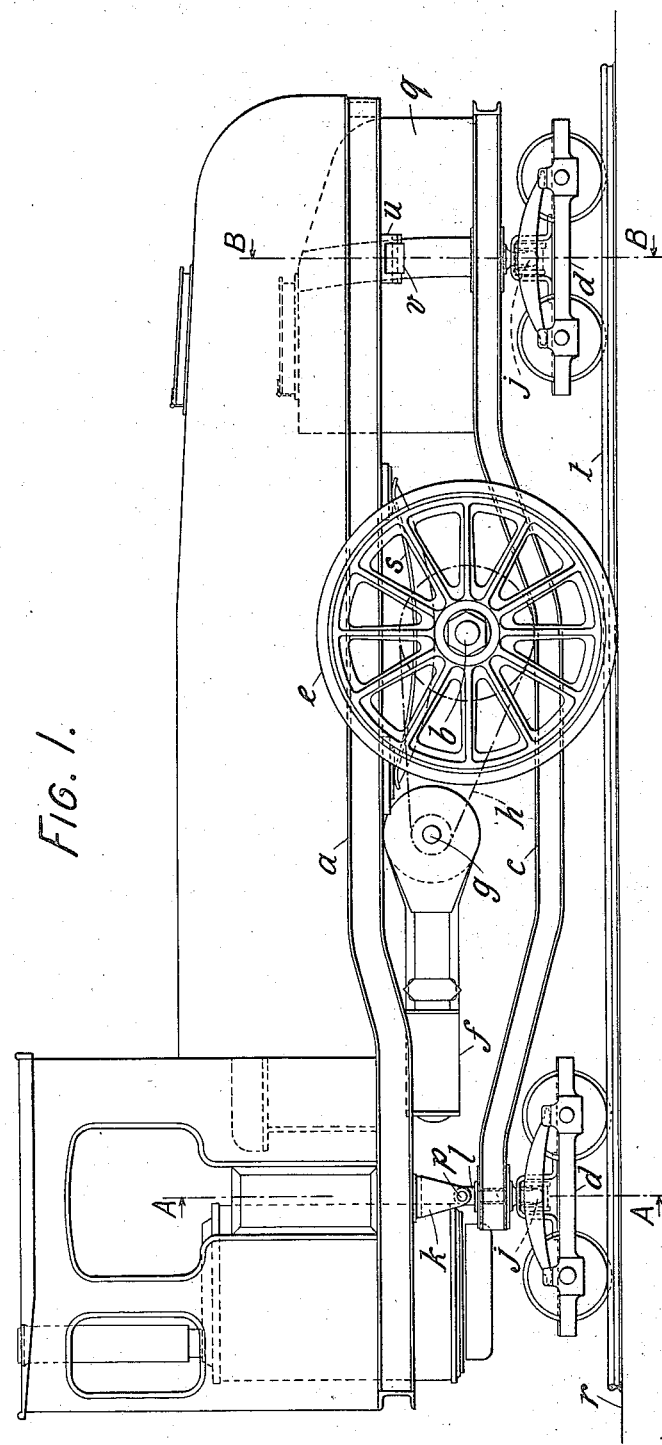
Fig. 1 is a lateral elevational view of the vehicle.
Figure 2:
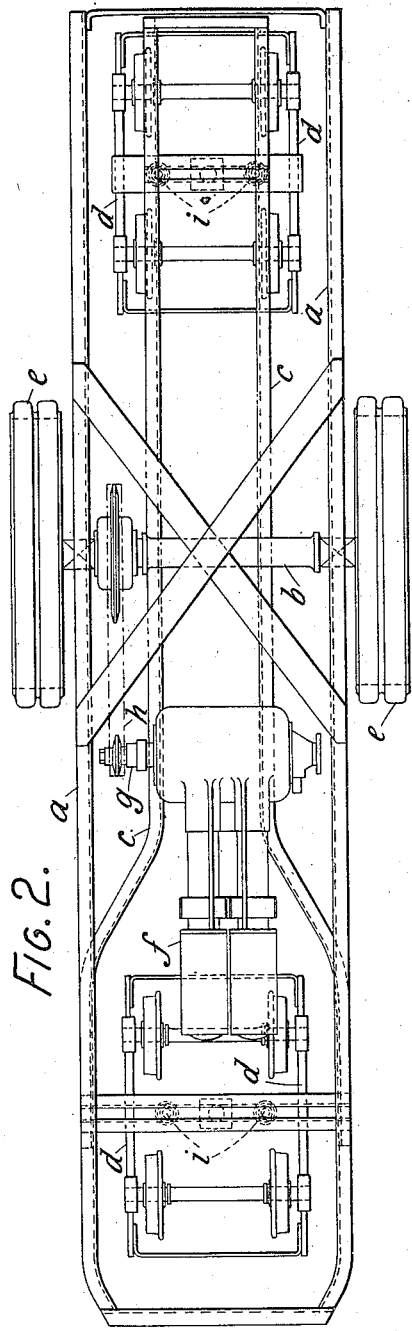
Fig. 2 is a plan view of the main constituents of this vehicle.
Figure 3:
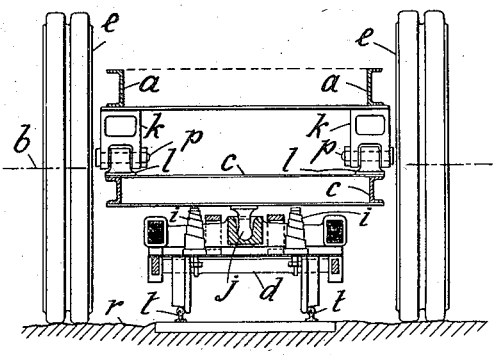
Fig. 3 is a front elevation in section on the line A—A of Fig. 1.
Figure 4:
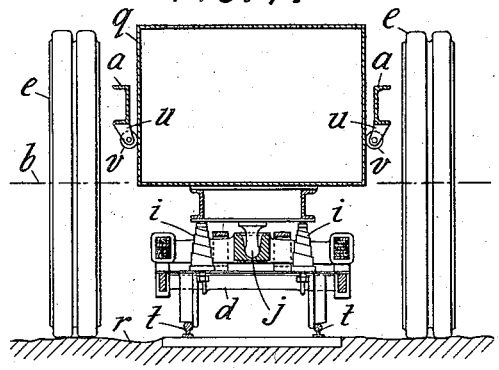
Fig. 4 is a rear elevation in section on the line B—B of Fig. 1.
Figure 7:
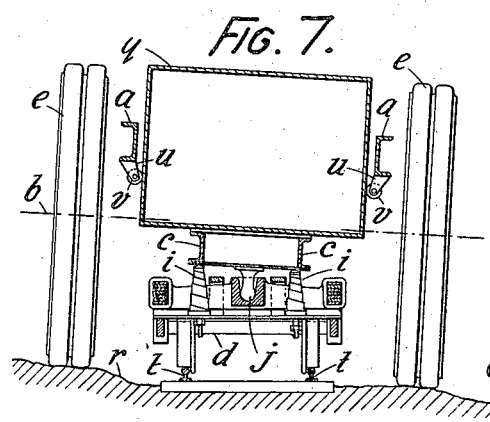

Fig. 6 is a similar lateral elevation showing the relative position of the bogies and road driving wheels while the latter pass through a relatively deep hollow or cavity the the road, and Fig. 7 is a rear elevation similar to Figure 4 showing the relative position of the bogies and the super and substructures when one driving wheel is passing over an obstacle on the road, while the other driving wheel is on a substantially level part of the road.

From the drawings above referred to, all constructional details unnecessary for the understanding of the invention, have been omitted for the sake of greater clearness.

The frame-work of the tractor shown is composed of two frames *a* and *c* arranged one above the other. The frame *a* heretofore referred to as the main frame or superstructure is carried by the axle *b* mounted on which are the driving wheels e adapted to run on the roadway r as shown outside of the rail track t. Obviously the arrangement may be such as to enable these driving wheels e to run inside the rail track, that is to say, between the rails t. These road driving wheels e are preferably shod with solid rubber tyres, but it is evident that, instead of using a driving unit of this kind, a road driving unit of the endless track type could be employed, or several pairs of driving wheels may be resorted to, if necessary, without or with detachable tyres of any suitable material.

The rear end of the main frame a is supported on the axle b by means of the usual springs s, appropriately mounted to the underside of the frame a. The axle b is the driven axle, rotation being imparted to it by any kind of motor, steam or petrol; alone or combined with an electric generator to supply auxiliary driving power if desired; a steam engine being diagrammatically indicated at f in Figs. 1, 2, 5 and 6, from the driving shaft g of which the axle b is driven preferably by means of a chain gear h. Two four-wheel bogies d are shown on the rail track t, one forward and the other aft, and it will be seen that the sub-frame c is supported near each of its ends on one of these bogies d and is preferably cushioned by springs i. The attachment of this frame c to each bogie takes the form of a ball-joint j at the end of a vertical pivot pin. This ball-joint permits the bogies d to pivot about their centres as may be necessary owing to the curvature of the rail track, and also to accommodate themselves to any want of parallelism between the horizontal plane of the sub-frame c and the plane of the rail surface t on which the bogies are running. These ball-joints also allow the main frame a and its road wheels e to conform with the sub-frame c in a lateral direction to any local elevation or depression of the road track or rail track.

The super structure or main frame a is, as shown, attached to the sub-frame c through the medium of horizontal pivot pins p at the front end of the vehicle. In the example shown two such pivot pins p are employed, each being journalled in an upright lug or bearing l mounted laterally at each side on the top of the sub-frame c preferably in the same vertical plane as the ball-jointed pin j. About these horizontal pivot pins p the main frame a is hinged by means of depending brackets k attached to the underside of the main frame a.

As will be understood, these pivot pins p enable the main frame a to oscillate in a substantial vertical plane about the horizontal axis passing through the pivot pins p and to take up a varying relation to the sub-frame c in conformity with the undulations of the road track r relatively to the rail track t. In this way, therefore, the whole vehicle is divided into an upper unit constituted by the super-structure a including the road wheels and the axle b, and a lower unit comprising the sub-structure c with the bogies d. It is essential that these two main units a and c should always remain substantially in the same vertical plane, that is to say, there must be no possibility of great lateral displacement of the main frame a with its road wheels relatively to the sub-frame c with its rail wheels.

To this end the main frame a and the sub-frame c should be appropriately guided also for the performance of the vertical movements, and as shown, this is effected by causing the outer members of the main frame a (see Figures 1, 4, 5, 6 and 7) to moveably embrace an upright guide or erection q (a tank in the instance shown) mounted on the rear end of the sub-frame c in such a way that vertical displacement is possible, but lateral displacement is prevented. From these figures it will be seen that the outer members or vertical sides of the main frame a are provided with bearing blocks u journalled in which are rollers v working on the adjacent upright sides of the erection q.

If it is required that an erection wider than q as shewn be carried on the sub-frame, the frames a may be shortened and rollers or other suitable guides placed at the forward end of the erection.

The combination of the ball-joints j and the pivots p above described, admits, as will be understood, of a great variety of relative movements and therefore imparts great flexibility to the whole structure. For example, it will be seen from Figs. 5 and 6 that both road wheels e may be riding over a steep local obstruction on the road or dip suddenly into a local depression, while from Fig. 7 it will be seen that one road wheel alone may be raised or depressed from the normal level, yet the sub-frame c and the bogies d will always keep the rails, no matter how sharp the curve the whole vehicle may be taking.

It will be obvious to those skilled in the art that, while the tractor shown for the purpose of illustrating the application of this invention is not of a readily convertible type, the invention should not thereby be held to be limited as applying to such tractors only, for, as already stated, this frame arrangement would, without any material modifications, be readily applicable to tractor or carrier vehicles of any kind without departing from the spirit of this invention. It will also be understood that the pins p could be readily removed and replaced to secure, for example, a front axle carrying a pair of road steering wheels and springs in which case after detaching the sub-structure c and the bogies from the super-structure and attaching the front road axle to the bearing blocks $k$, the super-structure with its road wheels could then be readily used as a pure road tractor, if desired. It will, moreover, be obvious that this same tractor could be provided also with a front axle and a pair of road steering wheels with sub-frame $c$ and both bogies maintained in attachment to the vehicle so that the front steering wheels could be either raised for rail service if the front or the rear bogie $d$ were to steer, or lowered where steering by means of the road steering wheels for road service may be required. In the latter case the aft end of the sub-frame with bogie, would be raised to give sufficient ground clearance.

It will be evident also that provision could readily be made for the main engine, to drive in addition to the road wheels, a generator, as already stated, or if preferred to provide a separate engine to drive a generator adapted to supply electric current to a motor or motors on each bogie and, if desired also, to a motor or motors on some or all of the trucks or carriages of the rolling stock drawn by the vehicle.

I claim :—

1. A power driven vehicle comprising in combination a superstructure and a substructure, means whereby said superstructure is pivotally mounted on said substructure to enable it to perform oscillatory movements in a vertical sense and means whereby the said substructure is flexibly connected to a wheel carriage, such as a rail bogie, to enable both the superstructure and the substructure jointly to perform compound oscillatory movements in a lateral sense.

2. A power driven vehicle comprising in combination a substructure having its forward end supported on and connected to a wheel carriage, such as a rail bogie by means enabling it to perform lateral movements thereon in a horizontal sense, and a superstructure having its forward end supported on and connected to the forward end of the said substructure by means enabling it to perform oscillatory movements relatively to the said substructure in a vertical sense and means for guiding the said superstructure on the said substructure for independent movements thereof in a vertical sense and for joint movements therewith in a lateral sense.

3. A power driven vehicle comprising in combination a substructure having its ends fore and aft respectively supported on and connected to a rail bogie on a vertical pivot enabling it to perform oscillatory movements laterally and a superstructure having its forward end supported on and pivoted to the said substructure to enable it to perform oscillatory movements on said substructure in a vertical sense, and means whereby the rear end of said superstructure is guided on the rear end of the said substructure for independent vertical movement thereof and for joint lateral movement therewith, substantially as set forth.

4. A power driven vehicle comprising in combination a substructure supported in a pivotal manner, such as by a ball joint, on a rail bogie, a superstructure pivotally connected to the said substructure by means enabling it to perform oscillatory movements relatively to the said substructure in a vertical sense, and power driven road driving wheels on which said superstructure is resiliently supported substantially as set forth.

5. A power driven vehicle comprising in combination a substructure having its forward and rear ends respectively supported on and centrally connected to a rail bogie by a ball joint, a superstructure having its forward end mounted on the forward end of the said substructure by horizontal pivot pins, a pair of road driving wheels forming part of the said superstructure substantially midway of the vehicle, an erection on the rear end of the said substructure and means whereby the rear end of the said superstructure is guided on said erection to perform independent movements substantially vertically thereon, substantially as set forth.

6. A power driven vehicle comprising in combination a substructure supported on and connected fore and aft to a rail bogie centrally by means of a ball joint formed on a vertical pivot pin and a superstructure supported on and pivoted to the said substructure by means of horizontal pivot pins located in a vertical plane passing axially through the said ball joint, substantially as and for the purpose described.

7. A power driven vehicle comprising in combination a substructure supported on and connected fore and aft to a rail bogie centrally by means of a ball joint formed on a vertical pivot pin, a superstructure having its forward end supported on and connected to the forward end of the said substructure by horizontal pivot pins in a vertical plane passing axially through the said ball-joined pivot pin of the front bogie, and having its rear end guided vertically on the rear end of the said substructure substantially centrally above the rear bogie and a pair of road driving wheels having its axle located substantially midway of the vehicle between the said super and substructures and resiliently supporting the said superstructure, substantially as described.

In testimony whereof I affix my signature in presence of two witnesses.

ALEXANDER GALBRAITH.

Witnesses:
FRANK BLAKEY,
MAURICE ARTHUR VICTOR LONDON.